United States Patent
Keohane et al.

(10) Patent No.: US 10,633,845 B2
(45) Date of Patent: Apr. 28, 2020

(54) PLUMBING TRAP WITH TOP ACCESS

(71) Applicant: Oxxo, LLC, Lyndhurst, OH (US)

(72) Inventors: Patrick F. Keohane, Solon, OH (US); Steven M. Caldwell, Lyndhurst, OH (US)

(73) Assignee: Oxxo, LLC, Lyndhurst, OH (US)

( * ) Notice: Subject to any disclaimer, the term of this patent is extended or adjusted under 35 U.S.C. 154(b) by 0 days.

(21) Appl. No.: 16/041,033

(22) Filed: Jul. 20, 2018

(65) Prior Publication Data

US 2019/0112795 A1 Apr. 18, 2019

Related U.S. Application Data

(60) Provisional application No. 62/572,602, filed on Oct. 16, 2017.

(51) Int. Cl.
*E03C 1/284* (2006.01)
*F16L 45/00* (2006.01)

(52) U.S. Cl.
CPC .............. *E03C 1/284* (2013.01); *F16L 45/00* (2013.01)

(58) Field of Classification Search
CPC ...................................................... E03C 1/284
USPC ........................................................... 4/256.1
See application file for complete search history.

(56) References Cited

U.S. PATENT DOCUMENTS

| 607,983 | A | 7/1898 | Cooper |
|---|---|---|---|
| 712,759 | A | 11/1902 | Breen |
| 1,759,803 | A | 5/1930 | Pysher |
| 2,404,259 | A | 7/1946 | Veitch |
| 2,567,165 | A | 9/1951 | Buskirk |
| 2,756,076 | A | 7/1956 | Rodriguez |
| D659,809 | S | 5/2012 | Smith |
| 2009/0173396 | A1 | 7/2009 | Spadaveccia |
| 2015/0275490 | A1 | 10/2015 | Letcher |

FOREIGN PATENT DOCUMENTS

FR      1504039      12/1967

OTHER PUBLICATIONS

International Searching Authority, European Patent Office, International Search Report and Written Opinion for International App. No. PCT/US2018/056032 dated Jan. 31, 2019.

*Primary Examiner* — Lori L Baker (74) *Attorney, Agent, or Firm* — McDonald Hopkins LLC (57) ABSTRACT

A plumbing trap is provided with a top access clean out for use with a P-trap. A horizontal extension conduit having an elbow having a threaded connection for attachment to a P-trap. The elbow forms an outside curvature at which is formed a clean out member providing bi-directional access within the plumbing passageway. The clean out member allows for access without having to remove the P-trap and while fluid flow is maintained within the passageway. The clean out member includes an outlet aligned along an axis that is positioned in a vertical plane at a 45° angle relative to the first axis and a 45° angle relative to the second axis and a 45° angle relative to horizontal plane relative to the first axis. A second clean out member may be positioned in a mirror image and at a 90° angle to the first clean out.

20 Claims, 12 Drawing Sheets

PLUMBING TRAP WITH TOP ACCESS

CROSS-REFERENCE TO RELATED APPLICATIONS

This application claims priority to U.S. Provisional Patent Application No. 62/572,602 entitled "PLUMBING TRAP WITH TOP ACCESS" filed on Oct. 16, 2017 which is incorporated by reference in its entirety.

FIELD OF INVENTION

This application relates to a plumbing assembly for use with a drain. More particularly this application relates to a plumbing assembly that includes a clean out that can allow access within a plumbing passageway to remove blockages without having to remove a trap member.

BACKGROUND

In plumbing, a trap is a device which has a shape that uses a bending path to capture water to prevent sewer gases from entering buildings, while allowing waste to pass through. Traps are typically U, S, P or J-shaped pipe located below or within a plumbing fixture. An S-shaped trap is also known as an S-bend. The most common of these traps in houses is referred to as a P-trap. It is the addition of a 90 degree fitting on the outlet side of a U-bend, thereby creating a P-like shape. It is also referred to as a sink trap because it is installed under most house sinks.

Because of its shape, the trap retains a small amount of water after the fixture's use. This water in the trap creates a seal that prevents sewer gas from passing from the drain pipes back into the occupied space of the building. Essentially all plumbing fixtures including sinks, bathtubs, and toilets must be equipped with either an internal or external trap.

Because it is a localized low-point in the plumbing, sink traps also tend to capture heavy objects (such as jewelry) that are inadvertently dropped into the sink. Traps also tend to collect hair, sand, and other debris and limit the ultimate size of objects that will pass on into the rest of the plumbing, thereby catching oversized objects.

For all of these reasons, most traps can either be disassembled for cleaning or they provide some sort of clean out feature. However, with conventional P-traps the disassembly of the trap is generally the first and only method of removing blockages. Accessing the drain with a snake further requires removal of the trap sections, even if a blockage is located passed the trap element. And, the mess, time, trouble and mere in-accessibility of disassembling the fixture is often the difficult task due to its location under a sink, and especially those sinks set into cabinets that have drawers.

Some methods and devices are known that incorporate various mechanisms for providing access within plumbing systems through various specialty access features. For example:

U.S. Pat. No. 2,756,076, issued in the name of Rodriguez, Jr., discloses an adjustable angle waste fitting that includes a series of pipe sections that are successively and integrally connected to one another in successive angular relation. The sections each have a frangible juncture with the immediately preceding section, a respective frangible juncture, whereby a fully packed and sealed connection with a bell of a next pipe fitting may be formed. An end elbow includes a generally horizontal straight section that terminates in an internally threaded collar and having a removable plug so as to provide a clean-out for the fitting.

U.S. Patent Publication No. 2009/0173396, published in the name of Spadaveccia, discloses a unitary, one piece plumbing pipe for use as a drain and vent pipe. It can be used to drain a single appliance using the typical goose-neck style drain pipe, but it can also vent an entire plumbing system. No vent through the roof of a building is necessary in that the vent pipe has a vertical portion extending upwardly above the highest point of the drainage plumbing, but not through said building to the outside. The vent pipe has an opening capable of permitting ambient air to enter the pipe when there is negative fluid pressure within said pipe, but not permitting any fluid to escape the vent pipe when there is positive fluid pressure within said pipe.

U.S. Patent Publication No. 2015/0275490, published in the name of Letcher, Jr., discloses a plumbing waste arm with a clean out that has a waste arm adapted to connect to a wall drain pipe at one end and a clean out end at an opposite end. The clean out end has a threaded portion that engages with a clean out portion cover to removably seal the clean out end. A vertical portion is disposed between the wall drain pipe end and the clean out end and connects to a P-trap using a slip nut. In use, a user removes the cap and feeds a snake in through tile clean out opening. The clean out end may be angled to allow use in plumbing configurations where the P-trap is in the way of the clean out portion. The threaded portion may have exterior threads with a cap or interior threads with a plug.

U.S. Design Pat. No. D659,809, issued in the name of Smith, discloses an ornamental design for a sink trap that includes a second entry port aft of the P-trap section.

U.S. Pat. No. 607,983, issued in the name of Cooper, discloses a sanitary trap that includes a clean-out at the top of the elbow at the back of the trap section.

U.S. Pat. No. 712,759, issued in the name of Breen, discloses a test trap or seal for sewer pipes that includes a pair of clean-out ports, one at the top of each elbow that forms the U-shaped trap.

U.S. Pat. No. 1,759,803, issued in the name of Pysher et al, discloses a pipe clean-out fitting that can be inserted in any point at a joint and incorporates two separate clean out ports, at 120° to each other and each 45° from a horizontal and vertical section, respectively.

It is preferable that a otherwise conventional P-trap plumbing components be modified in such a manner that allows for access in a manner that aids in the identification and removal of the most common types of blockages. Consequently, a need has been felt for providing a plumbing drain P-trap fixture improvement including clean out access elements without the limitations or drawbacks of the prior art.

BRIEF DESCRIPTION OF THE DRAWINGS

Embodiments of the present disclosure are described herein with reference to the drawings wherein.

DETAILED DESCRIPTION OF THE PREFERRED EMBODIMENTS

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar features may exist with each embodiment as are described herein and referred to in the Figures. Therefore, in certain views, only selected elements are indicated even though the features of the system or assembly may be incorporated in each of the embodiments. In the same manner, while a particular aspect of the disclosure is illustrated in these figures, other aspects and arrangements are possible, as will be explained below.

This application relates to an improved plumbing assembly 10 that improves access for maintenance and includes novel portions that are not disclosed or are otherwise available in the prior art. As illustrated by FIGS. 1-11 and 14, the plumbing assembly 10 includes an extension member 12 that defines a passageway for fluid and extends from a distal end 13 for connection to a plumbing system and an opposite proximal end 15. An elbow 14 that also defines a passageway for fluid may be connected to and extend from the proximal end 15 of the extension member 12. The extension member 12 may be aligned about a first axis 25 while the elbow 14 may have a shape that curves downwardly and terminates at an outlet 16 wherein the outlet 16 may be aligned about a second axis 27 that is generally perpendicular to the first axis 25.

In one embodiment, the extension member 12 and the elbow 14 may be of a generally continuous unitary construction of any appropriate cross-sectional shape, including without limitation, the cross sectional shape may comprise circular, cylindrical, oval, square, rectangular, or the like. Typical drain pipes are provided in 1¼" or 1½" diameters and it is intended that the outside diameter of the extension 12 may be similarly provided in 1¼" or 1½" diameters, although any size pipe may be utilized that is capable of providing the intended draining function. This disclosure contemplates other pipe dimensions including 2", 3", 4" and 6" as well as larger dimension of standard plumbing pipe sizes.

Figure 11:
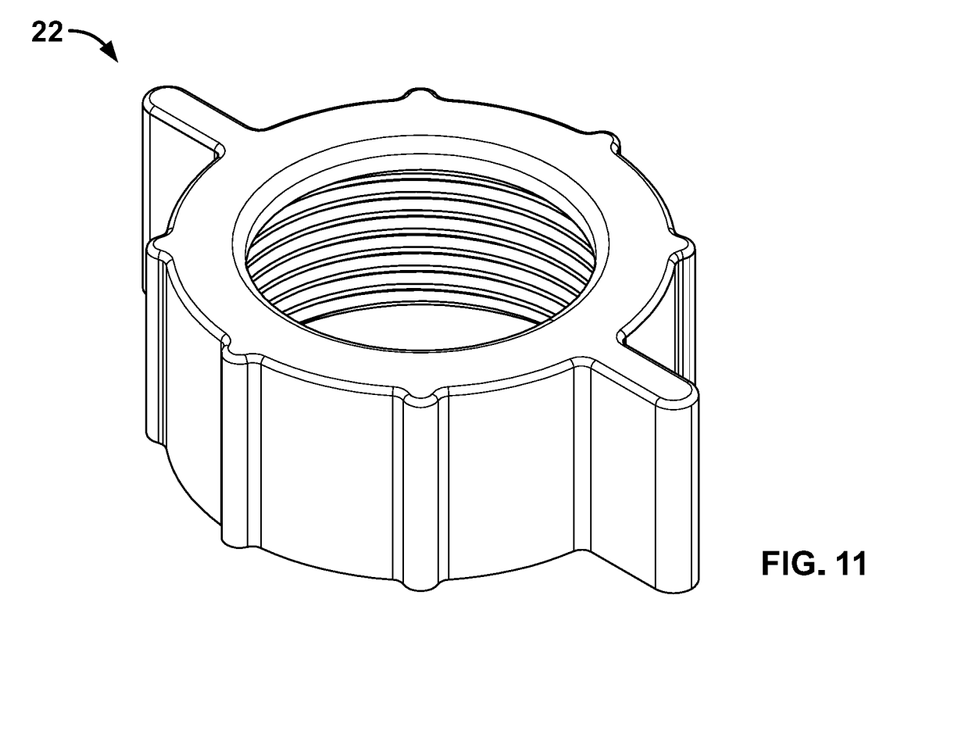
FIG. 11 is a perspective view of a threaded coupling for the plumbing assembly in accordance with the present disclosure.
Figure 12:
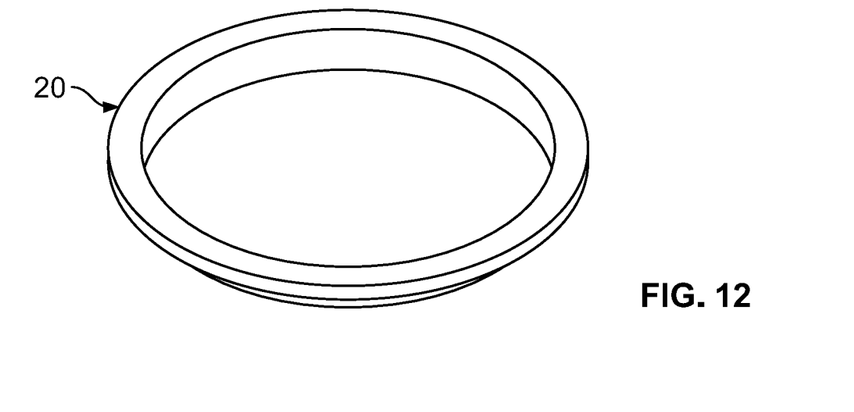
FIG. 12 is a perspective view of a coupling ring for the plumbing assembly in accordance with the present disclosure.
Figure 13:
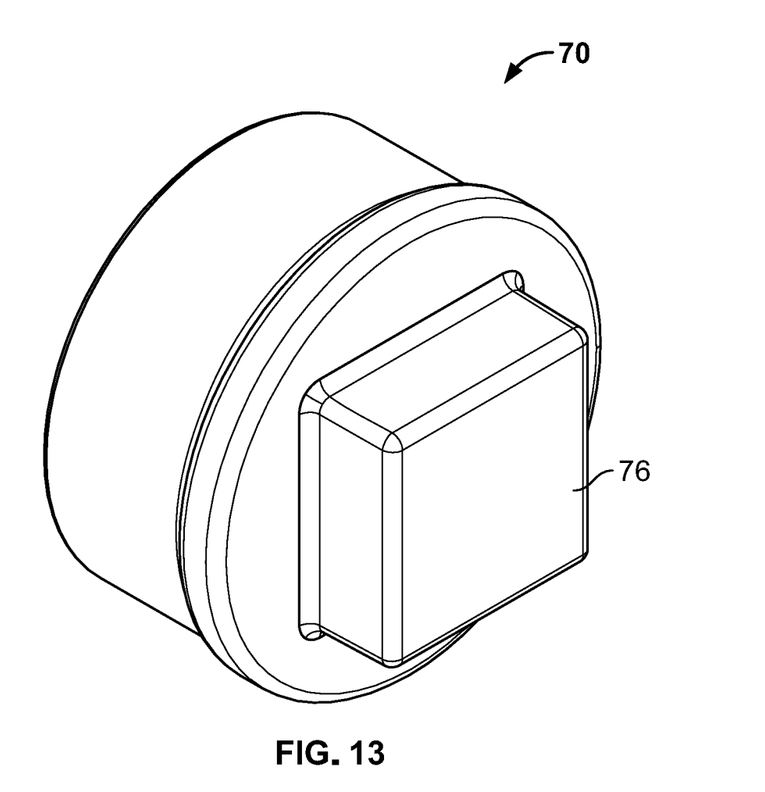
FIG. 13 is a perspective view of an embodiment of a clean-out cap for the plumbing assembly in accordance with the present disclosure.
Figure 14:
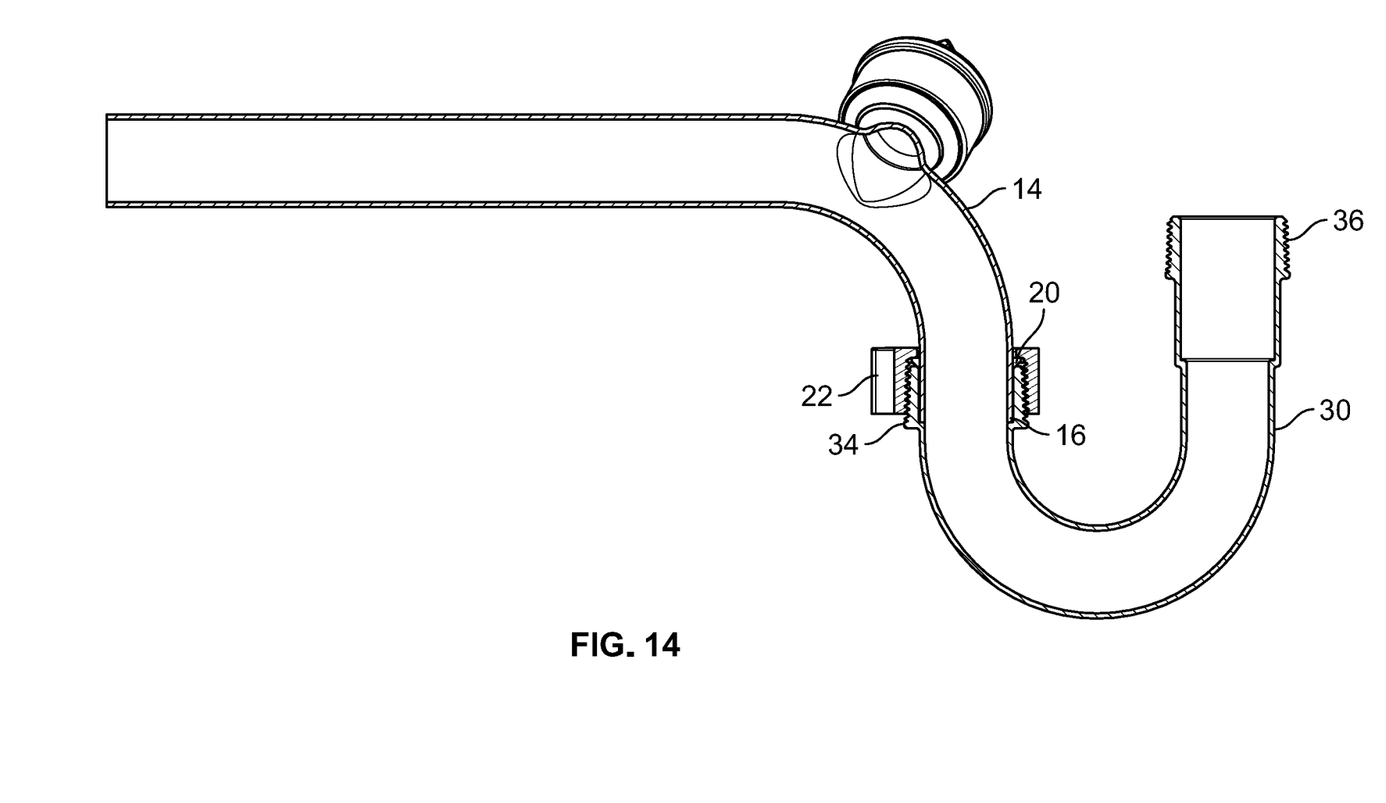
FIG. 14 is a cross sectional view of the plumbing assembly in accordance with the present disclosure.

A trap section 30 (FIG. 3) may be provided for attachment to the outlet 16 of the elbow 14 to form a localized low-point in the plumbing drain system. The attachment between the trap section 30 and the elbow 14 may include a threaded connection 18 with a sealing flange 20 (FIG. 12) and a threaded coupling 22 (FIG. 11). The trap section 30 may form a U shaped plumbing pipe that defines a passageway for fluid having a first end 34 and an opposite second end 36. The trap section 30 may include a first threaded outer surface 38 and a second threaded outer surface 40 along both the first and second ends 34, 36, respectively. Notably, the outlet 16 may include a smooth outer surface 17 to be slidingly received within the first end 34 of the trap section 30 for forming the threaded connection 18 (FIG. 4) with the sealing flange 20 and threaded coupling 22. Here the threaded connection 18 includes sealing flange 20 impinged by the threaded coupling 22 to threadingly attach to the first threaded outer surface 38 of the first end 34.

The elbow 14 forms an outside curvature 24 along its length in which at least one clean out member 32A, 32B may extend from the elbow 14 along its length. This application contemplates various embodiments in which the plumbing fixture 10 may include a left facing clean out member 32A, a right facing clean out member 32B or both left facing and right facing clean out members 32A, 32B and this disclosure is not limited in this regard. The configuration of the instant plumbing fixture 10 includes at least one clean out member 32A, 32B that allows a user to access blockages within the plumbing passageways of the plumbing system for maintenance or installation purposes in a beneficial way. It is common for a trap to be positioned forwardly from plumbing pipes (horizontal extension and elbow) in such a way as to block or inhibit clean out access, the position and arrangement of the components of the instant plumbing fixture 10 allow for clean out access along either side or both sides of the trap 30 while it is maintained in connection.

In particular, the position and orientation of the at least one clean out member 32A, 32B relative to the other components of the plumbing fixture 10 allows for a user to access fluid passageways in communication with the plumbing fixture 10 without having to deconstruct or remove the remaining components of the plumbing system in which the plumbing fixture 10 is installed. For example, the plumbing fixture 10 may be in fluid communication with a sink drain to allow fluid drainage within its passageways. In this instance, a plumber may access an upstream location from the cleanout member and a downstream location from the cleanout member while the trap 30 is connected to the plumbing fixture 10 and the sink drain. Further, as will be described more fully below, the at least one cleanout 32A, 32B may be positioned along the elbow 14 in such a manner that it allows for continuous flow of fluid within the passageway of the plumbing system while the cleanout(s) are opened for access by the plumber.

Figure 5A:
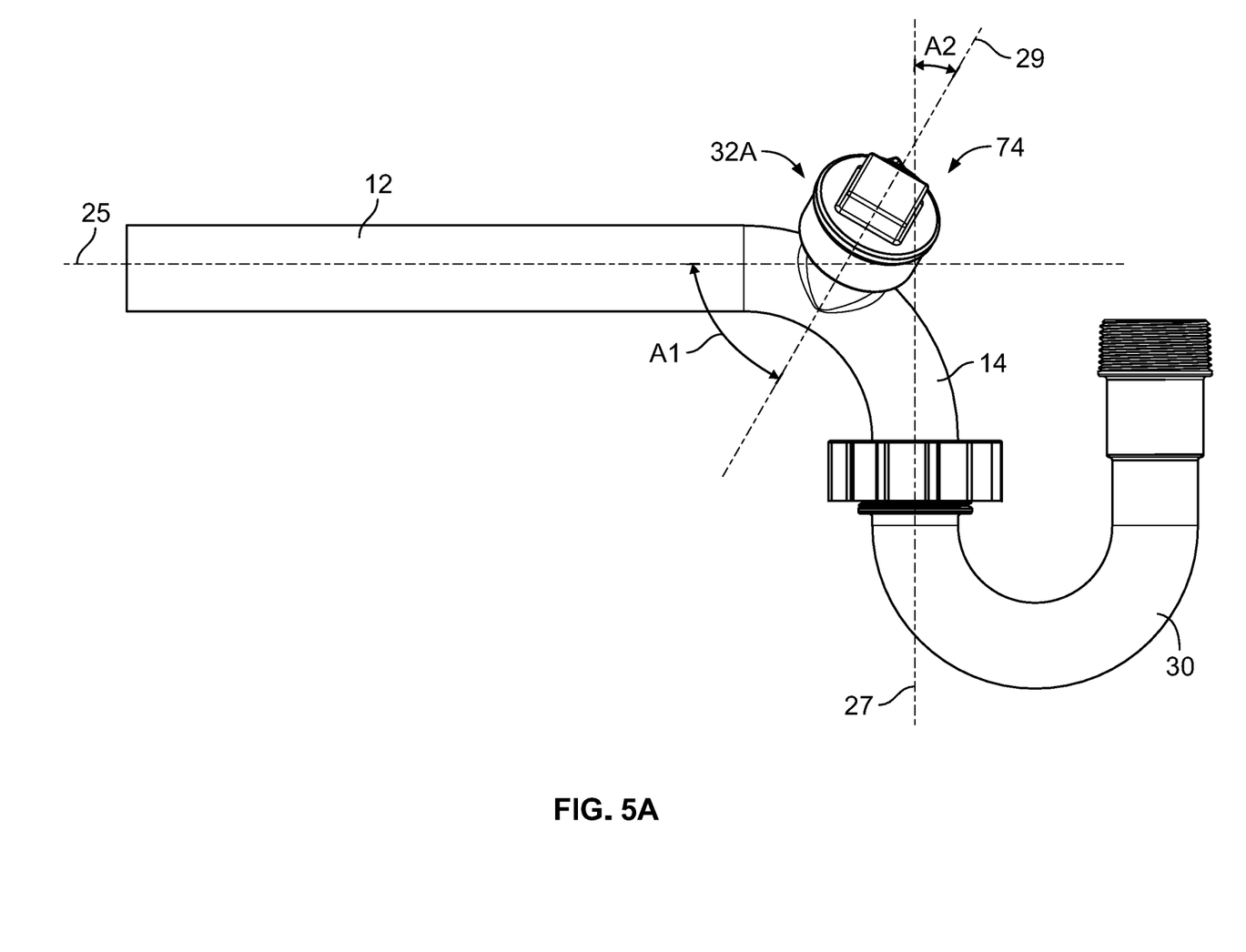
FIG. 5A is a first side view of the plumbing assembly of FIG. 1 in accordance with the present disclosure.
Figure 6:
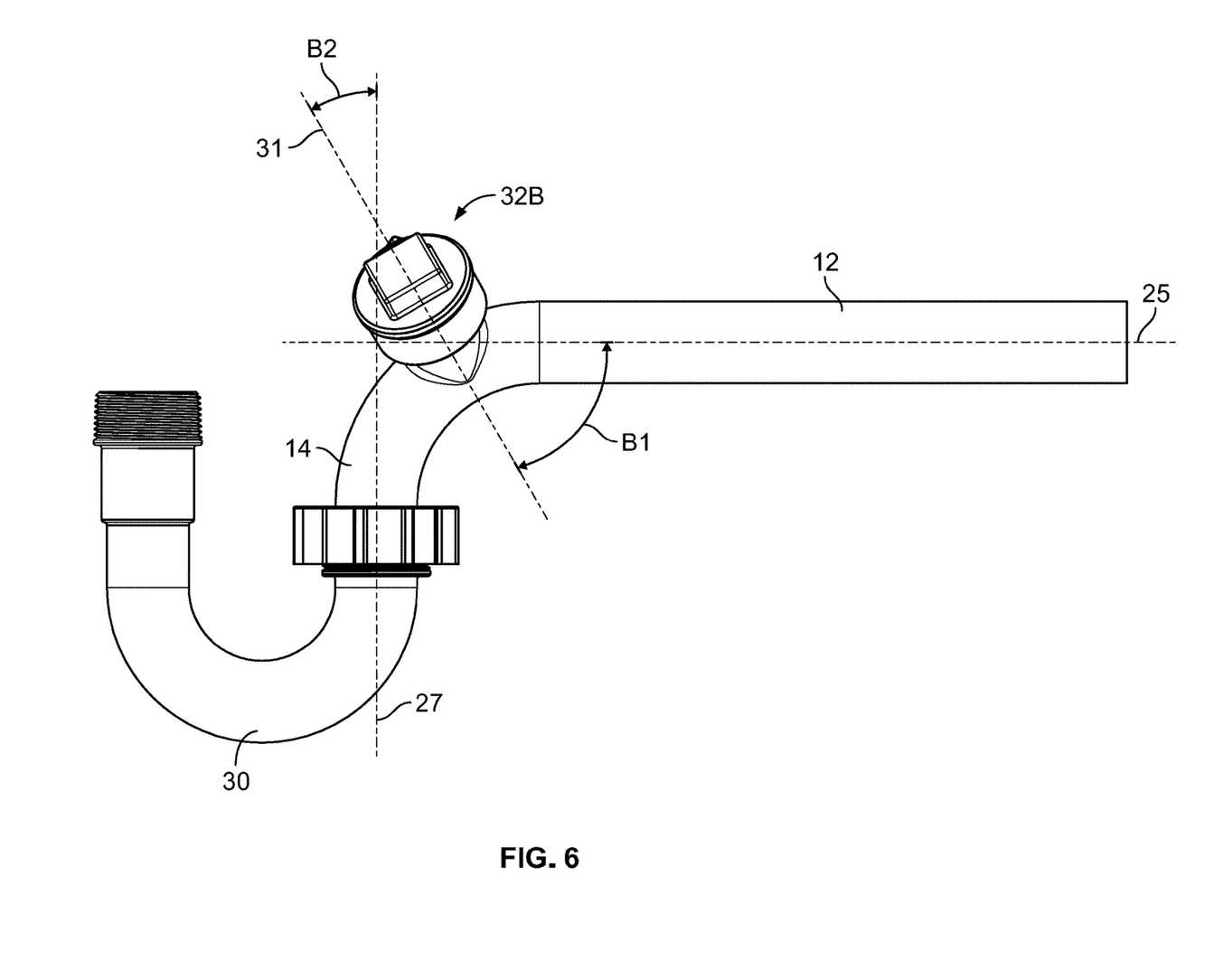
FIG. 6 is a second side view of the plumbing assembly of FIG. 1 in accordance with the present disclosure.

The clean out members 32A, 32B herein will be described with common features that may include common reference numbers and for simplicity may be referred to with a single reference number in which common features may apply. As illustrated by FIG. 5A, the first clean out member 32A may include an outlet 50A that is aligned along a third axis 29. The third axis 29 may be directed in a vertical plane from a side view at a first angle "A1" relative to the first axis 25 and a second angle "A2" relative to the second axis 27. The first angle A1 may be between 30 and 60 degrees and may also be about 45 degrees. The second angle A2 may be between 30 and 60 degrees and may also be about 45 degrees. Further, as illustrated by FIG. 6, the second clean out member 32B may include an outlet 50B that is aligned along a fourth axis 31. The fourth axis 31 may be directed in a vertical plane from a side view at a first angle "B1" relative to the first axis 25 and a second angel "B2" relative to the second axis 27. The first angle B1 may be between 30 and 60 degrees and may also be about 45 degrees. The second angle B2 may be between 30 and 60 degrees and may also be about 45 degrees.

Figure 7:
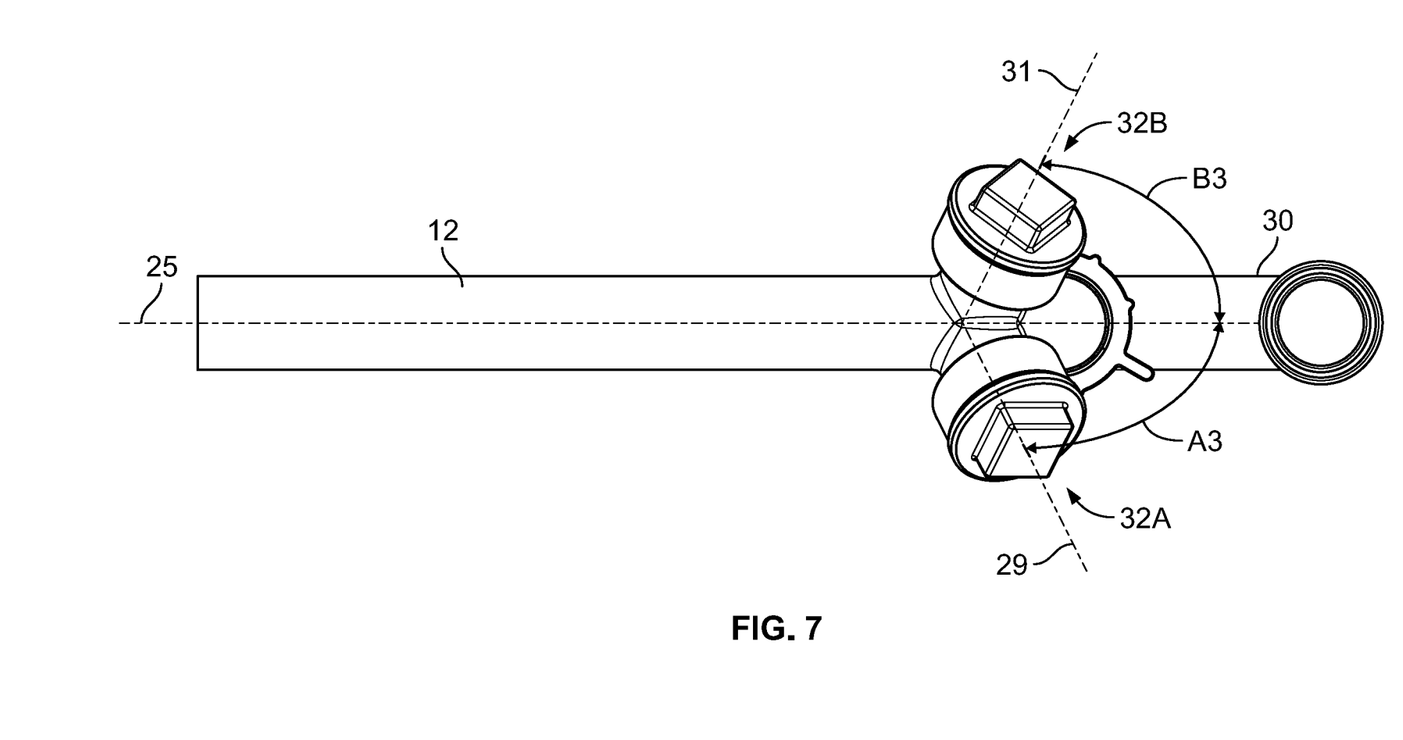
FIG. 7 is a top view of the plumbing assembly of FIG. 1 in accordance with the present disclosure.
Figure 8:
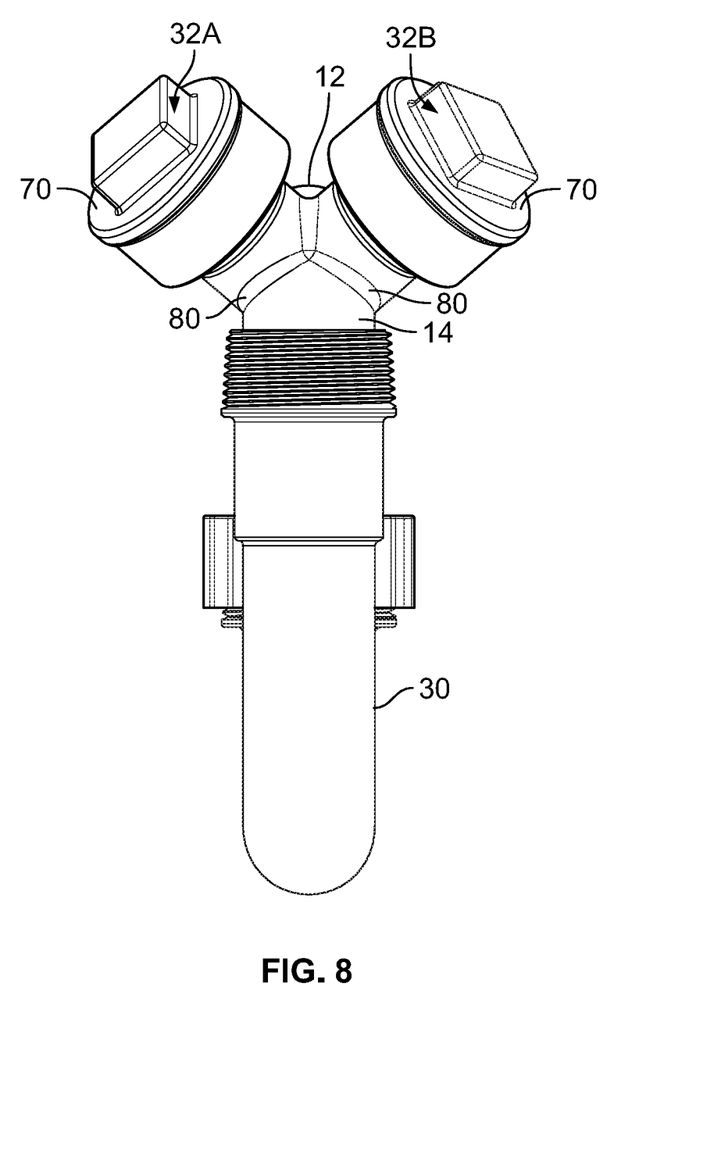
FIG. 8 is a front view of the plumbing assembly of FIG. 1 in accordance with the present disclosure.
Figure 9:
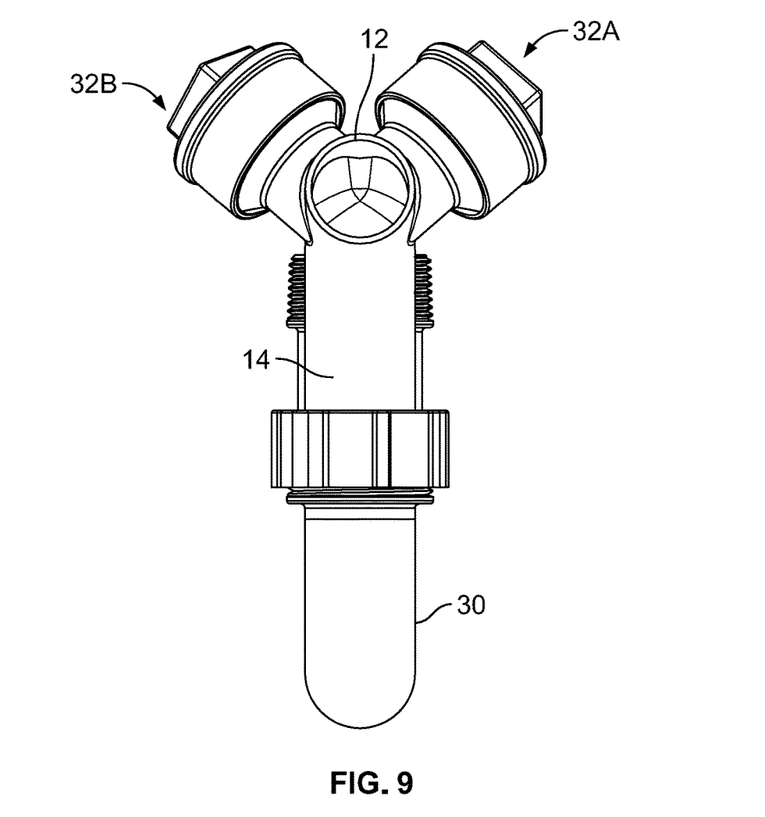
FIG. 9 is a rear view of the plumbing assembly of FIG. 1 in accordance with the present disclosure.
Figure 10:
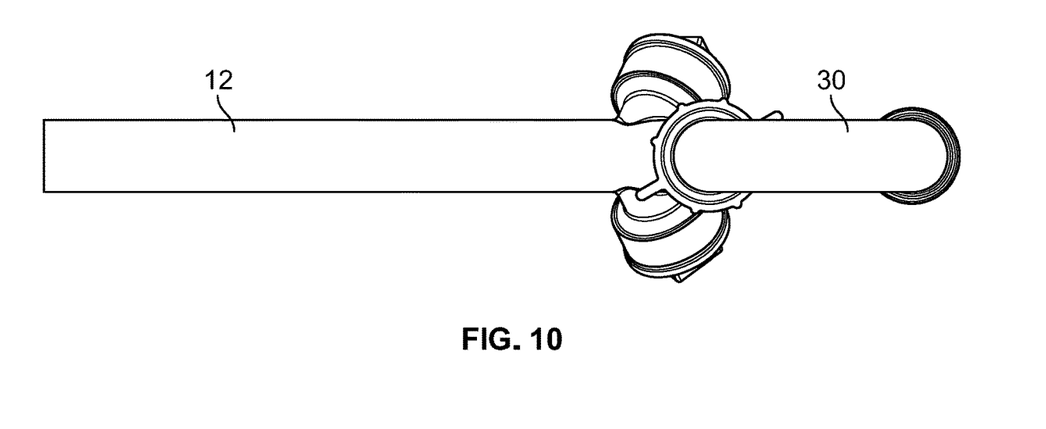
FIG. 10 is a bottom view of the plumbing assembly of FIG. 1 in accordance with the present disclosure.

As best shown in conjunction with FIG. 7, the first clean out member 32A may be perpendicularly positioned relative to the second clean out member 32B. Further, the outlet 50A of the first clean out member 32A may be aligned along the third axis 29 may be directed in a horizontal plane from a top view at a third angle "A3" relative to the first axis 25. The third angle A3 may be between 30 and 60 degrees and may also be about 45 degrees. Additionally, the second clean out member 32B aligned along the fourth axis 31 may be directed in a horizontal plane from a top view at a third angle "B3" relative to the first axis 25. The third angle B3 may be between 30 and 60 degrees and may also be about 45 degrees. As may become apparent, the various aspects of the invention form different form factors that may be used in different scenarios wherein limited space or interference with access exists such that only a right side access, or only a left side access configuration.

Figure 1:
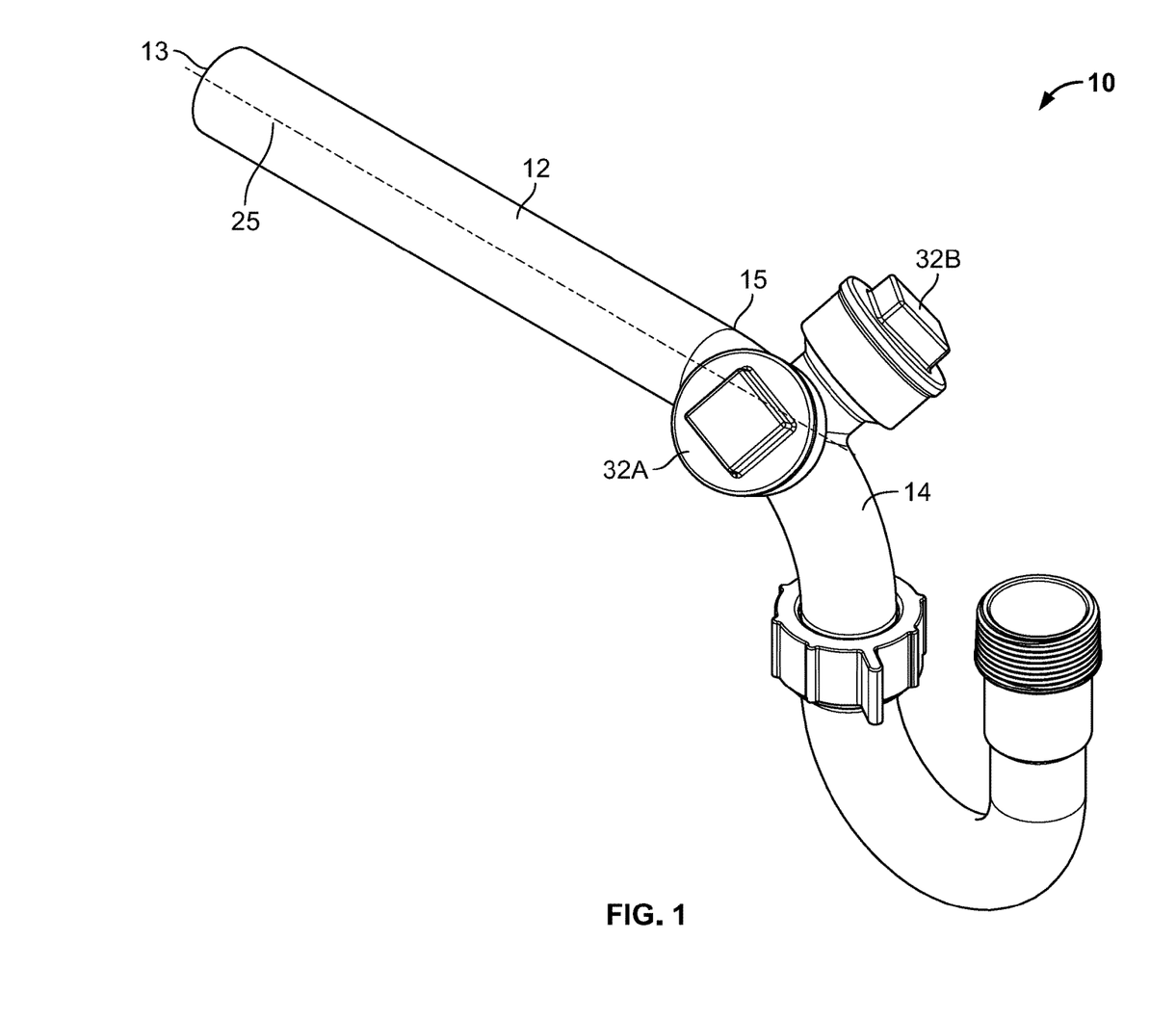
FIG. 1 is a perspective view of a plumbing assembly in accordance with the present disclosure.
Figures 2, 3:
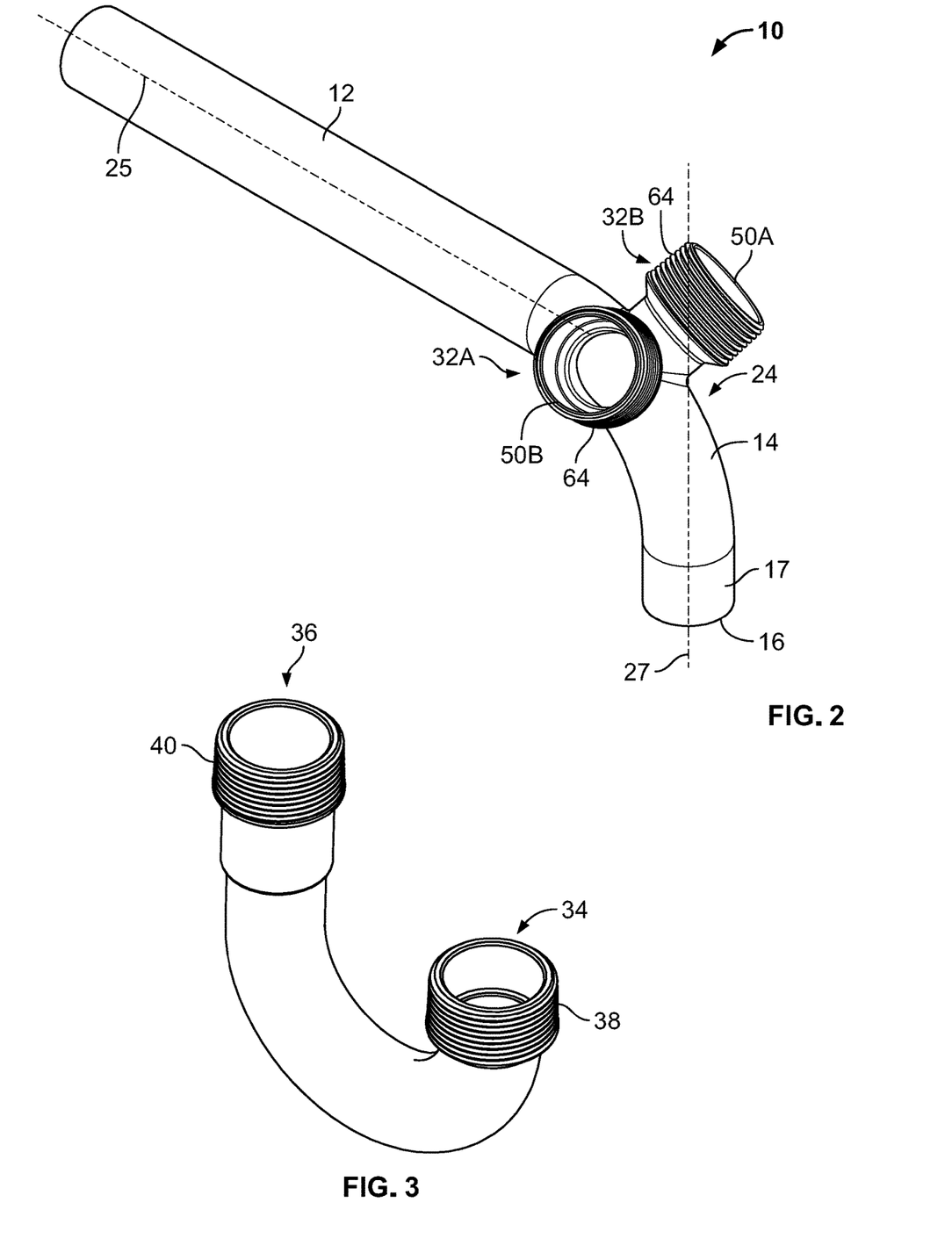
FIG. 2 is a perspective view of portions of the plumbing assembly in accordance with the present disclosure.
FIG. 3 is a perspective view of a trap member of the plumbing assembly in accordance with the present disclosure.
Figure 4:
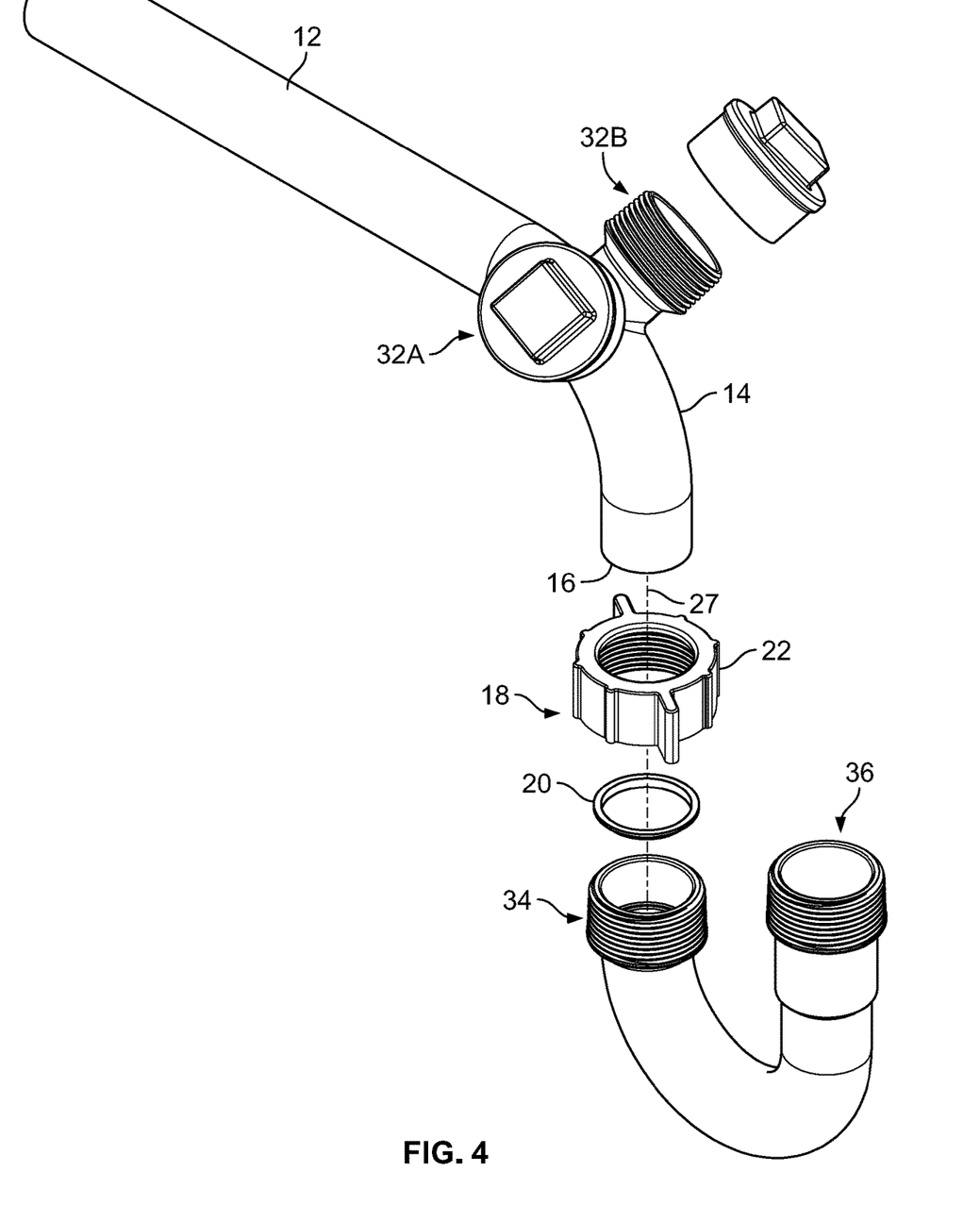
FIG. 4 is an exploded perspective view of the plumbing assembly of FIG. 1 in accordance with the present disclosure.

As should be apparent from the above description, the first clean out member 32A and second clean out member 32B may be similarly formed, and as such detail of only one such element 32 will be described herein. However, it is intended according to the various aspects of the present invention various configurations may exist within the spirit and scope of the current application. As such, each clean out 32A, 32B may include an outlet 50 that includes a threaded connection 64 (FIG. 2). The threaded connection 64 may include either an inside threaded connection or alternately include an outside threaded connection. A cap 70 having a thread 72 may be provided for threadingly engaging with the threaded connection 64. The cap 70 may be resealably connected to close the outlet 50A, 50B of either clean out member. The threaded connection may be configured to include various plumbing connections to allow for both be sealable to prevent fluid leakage and be removable by a user and various embodiments of the cap 70 are contemplated herein. The cap 70 may include a pliable sealing member provided about its threads or the threaded connection 64 to compress between the cap 70 and clean out member 32. Further, additional pliable sealing members may also be provided to further seal between the cap 70 and clean out member. Further, the cap 70 and clean out members 32A, 32B may also include an internal plug (not shown) for additional sealing to ensure the prevention of egress of gases from the sewer system to which a drain is connected.

Notably, the cap 70 may have various configurations and one such embodiment, the cap 70 includes a square shaped protrusion 76 to allow a plumber to easily grasp and turn the cap 70 to disengage the threaded connection. However, any such various fixture embodiments are contemplated in this application wherein the cap 70 may include a slot to receive a screwdriver head or other tool and may also have various other shaped protrusions and this disclosure is not limited in this regard.

The positioning of each clean out member 32A, 32B is of particular importance. As shown throughout the figures, each clean out 52 and 54 provide linearly unobstructed access to the passageway along both the first axis 25 and the second axis 27 such as to allow for access of a plumbing snake or similar or other obstruction removal devices into the waste drain plumbing without the need to remove the trap 30 or other components. The particular shape and positioning of the clean out members 32A, 32B allow for bi-directional access along the plumbing fixture 10 in which the snake or auger may be inserted to dislodge a blockage within the passageway. Further, the particular shape and positioning of the clean out members 32A, 32B relative to the extension 12 and the elbow 14 components allows for the continuous flow of fluid through the passageway as the respective cap 70 has been removed from one of the clean out members 32A, 32B.

In operation, the various aspects of the present invention provide access to the drain lines in which they are installed without the need to remove any trap components. Quick access can be afforded by removal of the cap 70 and a plumber may thereby inspect and identify locations of any obstruction without the time, mess or inconvenience of removing the trap 30 unless necessary. A plumber can identify blockages within the trap immediately, and visual inspection along both the first axis 25 and the second axis 27 may be performed. Bi-directional access may be possible as a plumber can gain unrestricted access both upstream and downstream from the respective clean out member. This bi-directional access may be to the horizontal extension 12 with a plumbing snake or similar or other obstruction removal devices without the need to remove any trap 30 or other components and also a plumber can gain unrestricted access to the elbow 14 and trap 30 with a plumbing snake or similar or other obstruction removal devices without the need to remove any trap 30 or other components.

Figure 5B:
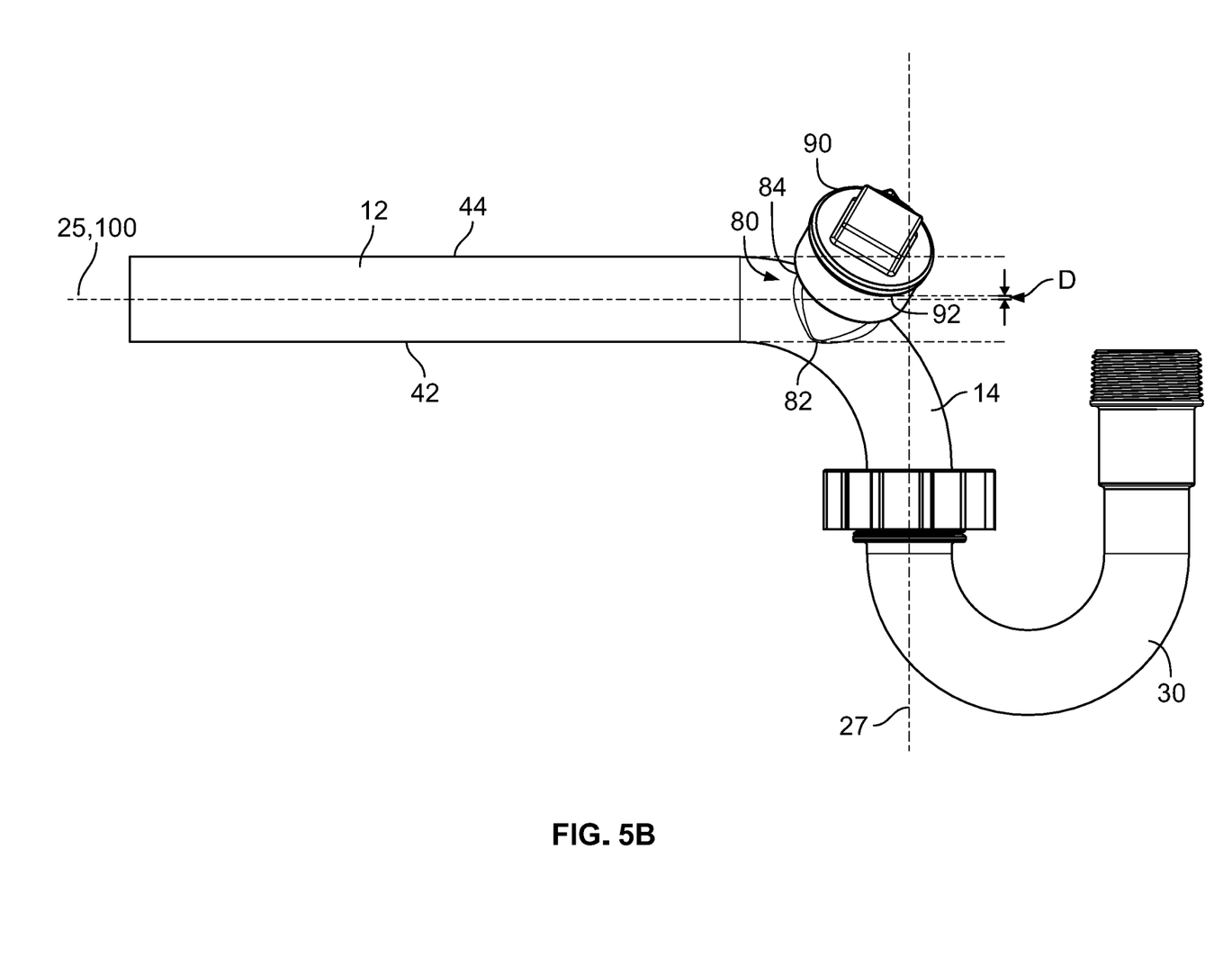
FIG. 5B is a first side view of the plumbing assembly of FIG. 1 in accordance with the present disclosure.

As further illustrated by FIG. 5B, the construction of the respective clean out member 32A, 32B may allow for both visual inspection as well as bi-directional plumbing tool access while continuous fluid flow through the passageway. As such, the clean out members 32A, 32B may include a position along an upper portion 74 of the elbow 14 adjacent to a downturn of the elbow 14 offset from alignment with the second axis 27 in which an interface connection 80 is defined. The interface connection 80 may have a lower perimeter point 82 that is generally aligned with a bottom 42 of the horizontal extension 12 and an upper perimeter point 84 that is generally aligned below a top 44 of the horizontal extension 12 as illustrated by FIG. 5B.

The clean out members 32A, 32B include a length from the interface connection 80 to the outlet 50A, 50B configured to allow for this functional operation. As such, the outlet 50A, 50B includes a defined perimeter 90 that includes a bottom perimeter point 92 that is aligned above a horizontal center axis 100 of the horizontal extension 12.

Notably, for illustration purposes the horizontal center axis 100 is generally aligned with the first axis 25. It should be noted, that fluid flow through the passageway is generally lower than the horizontal center axis 100 during normal flow through a plumbing system such as a sink or shower. It has been identified, that the bottom perimeter point 92 may be spaced above from the horizontal center axis 100 of the extension 12 a length D as illustrated by FIG. 5B. Length D may be less than about ½ an outer diameter length of the extension member 12. For example, if the outer diameter length of the extension member is 1 ½" than the length of D is about 0.75 inches. Further, in addition to this relationship, the defined perimeter 90 includes a top perimeter point that is aligned above the top of the horizontal extension 12 as illustrated by FIG. 5B. This relationship has been found to allow for both visual inspection through the clean outs as well as bi-directional plumbing tool access while continuous fluid flow through the passageway without having to remove the trap 30 from the plumbing system.

The above described threaded connection 18 between the elbow 14 and the trap 30 is such that the sealing flange 20 and threaded coupling 22 may be configured to slide onto the outlet 16 of the elbow 14 prior to the elbow 16 is received within the first end 34 of the trap 30. Notably, the sealing flange 20 may be a circular ring that includes an outer radial surface used to allow for clamping or compressed fit between the outlet 16 and the first end 34 wherein the threaded coupling 22 maybe rotated to translate the outer radial surface in compressed relation to the outlet and first end 34. The existence of threads along the first end 34 of the trap 30 as well as the second end of the trap 30 allows for the outlet 16 of the elbow to be threadless such that the threaded coupling 22 and sealing flange 20 may be positioned along the elbow 14 before the outlet 16 is inserted within the first end of the trap 30. This detail is due to the existence of the clean out members positioned along the plumbing fixture that would prevent a sealing flange or threaded coupling to be slid along the horizontal extension as well as the elbow as the clean out members would block such an operation.

Although the present embodiments have been illustrated in the accompanying drawings and described in the foregoing detailed description, it is to be understood that the embodiments of the disclosed plumbing assembly are not to be limited to just the embodiments disclosed, but that the systems and assemblies described herein are capable of numerous rearrangements, modifications and substitutions. Obviously, modifications and alterations will occur to others upon reading and understanding the preceding detailed description. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Having thus described the invention, we claim:

1. A plumbing fixture comprising:
   a horizontal extension having a distal end for connection to a waste pipe opposite a proximal end, the horizontal extension aligned along a first axis;
   an elbow extending from said proximal end and including an outside curvature with an outlet, said outlet aligned along a second axis wherein said second axis is generally perpendicular to said first axis;
   said elbow selectively sealingly attachable to a trap member;
   at least one clean out member positioned along said outside curvature of said elbow to provide bi-directional access upstream from the clean out member and downstream from the clean out member, wherein the clean out member is positioned offset from alignment with the second axis.

2. The plumbing fixture of claim 1, wherein said at least one clean out member comprises:
   an outlet aligned along a third axis wherein said third axis is directed in a vertical plane at a first angle "A1" relative to the first axis and a second angle "A2" relative to the second axis and wherein the outlet is aligned along said third axis directed in a horizontal plane a third angle "A3" relative to the first axis, wherein the first angle A1 is between 30 and 60 degrees, the second angle is between 30 and 60 degrees, and the third angle is between 30 and 60 degrees.

3. The plumbing fixture of claim 2, wherein said first angle A1 is about 45 degrees, said second angle A2 is about 45 degrees, and said third angle A3 is about 45 degrees.

4. The plumbing fixture of claim 2, further comprising a second clean out member wherein said second clean out member comprises:
   a second outlet aligned along a fourth axis wherein said fourth axis is directed in a vertical plane at a first angle "B1" relative to the first axis and a second angle "B2" relative to the second axis and wherein the outlet is aligned along said forth axis directed in a horizontal plane a third angle "B3" relative to the first axis, wherein the first angle B1 is between 30 and 60 degrees, the second angle B2 is between 30 and 60 degrees, and the third angle B3 is between 30 and 60 degrees.

5. The plumbing fixture of claim 4, wherein said first angle B1 is about 45 degrees, said second angle B2 is about 45 degrees, and said third angle B3 is about 45 degrees wherein said third axis and said fourth axis are generally perpendicular.

6. The plumbing fixture of claim 1, wherein said clean out member includes a cap.

7. The plumbing fixture of claim 4, wherein said second clean out member includes a cap.

8. The plumbing fixture of claim 1, wherein said horizontal extension and said elbow includes nominal diameter selected from a group consisting of: 1¼" diameter; and 1½" diameter.

9. The plumbing fixture of claim 1, wherein said horizontal extension and elbow is made of at least one of polyvinyl chloride, copper, brass, iron, and cast iron.

10. A plumbing fixture comprising:
    a horizontal extension defining a fluid passageway having a distal end for connection to a waste pipe opposite a proximal end, the horizontal extension aligned along a first axis;
    an elbow defining a fluid passageway extending from said proximal end and including an outside curvature with an outlet, said outlet aligned along a second axis wherein said second axis is generally perpendicular to said first axis;
    said elbow selectively sealingly attachable to a trap member;
    a first clean out member positioned along said outside curvature of said elbow to provide access upstream from the clean out member and downstream from the clean out member while allowing the continuous flow of fluid within the elbow and horizontal extension, wherein the clean out member is positioned offset from alignment with the second axis.

11. The plumbing fixture of claim 10, wherein said first clean out member allows for both visual inspection as well as plumbing tool access without having to remove the trap member while allowing fluid flow through the passageway.

12. The plumbing fixture of claim 10, wherein said first clean out member is positioned along an upper portion of the elbow adjacent to a downturn of the elbow and is offset from alignment with the second axis.

13. The plumbing fixture of claim 12, wherein said clean out member includes an interface connection along the elbow, said interface connection includes a lower perimeter point that is generally aligned with a bottom of the horizontal extension and an upper perimeter point that is generally aligned below a top of the horizontal extension.

14. The plumbing fixture of claim 13, wherein the clean out member includes an outlet such that the clean out member has a length from said interface connection to said outlet, said outlet includes a defined perimeter having a bottom perimeter point that is aligned above a horizontal center axis of the horizontal extension.

15. The plumbing fixture of claim 14, wherein the bottom perimeter point is spaced from the horizontal center axis of the horizontal extension a length D.

16. The plumbing fixture of claim 15, wherein said length D is less than about ½ the length of an outside diameter of the horizontal extension.

17. The plumbing fixture of claim 14, wherein said defined perimeter includes a top perimeter point that is aligned above the top of the horizontal extension.

18. The plumbing fixture of claim 10, wherein said first clean out member further comprises
a first outlet aligned along a third axis wherein said third axis is directed in a vertical plane at a first angle "A1" relative to the first axis and at a second angle "A2" relative to the second axis and wherein the first outlet is aligned along the third axis directed in a horizontal plane a third angle "A3" relative to the first axis, wherein the first angle A1 is about 45 degrees, the second angle A1 is about 45 degrees, and the third angle A1 is about 45 degrees;

and further comprising a second clean out member wherein said second clean out member comprises:
a second outlet aligned along a fourth axis wherein said fourth axis is directed in a vertical plane at a first angle "B1" relative to the first axis and a second angle "B2" relative to the second axis and wherein said second outlet is aligned along said fourth axis directed in a horizontal plane a third angle "B3" relative to the first axis, wherein the first angle B1 is about 45 degrees, the second angle B2 is about 45 degrees, and the third angle B3 is about 45 degrees;
wherein said third axis and said fourth axis are generally perpendicular.

19. A plumbing fixture comprising:
a horizontal extension defining a fluid passageway having a distal end for connection to a waste pipe opposite a proximal end, the horizontal extension aligned along a first axis;
an elbow defining a fluid passageway extending from said proximal end and including an outside curvature with an outlet, said outlet aligned along a second axis wherein said second axis is generally perpendicular to said first axis;
said elbow selectively sealingly attachable to a trap member with a threaded connection; and
at least one clean out member positioned along said outside curvature of said elbow to provide access upstream from the clean out member and downstream from the clean out member while allowing the continuous flow of fluid within the elbow and horizontal extension;
wherein said elbow includes a smooth outer surface that is positionable within a first end of said trap member and said threaded connection comprises a threaded coupling such that said threaded coupling is slidingly received over said elbow before said outlet of said elbow is positioned within said first end of said trap member.

20. The plumbing fixture of claim 19 further comprising a sealing flange positioned between the threaded coupling, said outlet of the elbow, and said first end of the trap member.

* * * * *